United States Patent

[11] 3,615,327

[72] Inventor Steve M. McLary
Perrysburg, Ohio
[21] Appl. No. 851,649
[22] Filed Aug. 20, 1969
[45] Patented Oct. 26, 1971
[73] Assignee Owens-Illinois, Inc.

[54] METHODS AND APPARATUS FOR APPLYING OXIDE COATING TO GLASS CONTAINERS
4 Claims, 3 Drawing Figs.

[52] U.S. Cl. .................................................. 65/60, 65/30, 65/146
[51] Int. Cl. .................................................. C03c 17/00
[50] Field of Search ........................................ 65/60, 66, 67, 184, 185, 186, 30, 146

[56] References Cited
UNITED STATES PATENTS
2,119,608 6/1938 Stewart .................... 65/60 X
3,519,408 7/1970 Russell ...................... 65/60 X Primary Examiner—Arthur D. Kellogg
Attorneys—John R. Nelson and Edward J. Holler ABSTRACT: Methods and apparatus for applying a metallic oxide film to the outer surface of a glass container. A glass container is formed with an integral moil portion projecting upwardly from the container finish and is suspended from a support mechanism which engages only the moil portion at a location above the container finish. In the application of coatings with which the present invention is concerned, it is necessary that the container be at an elevated temperature, in the order of 1,000° F., and the coating is applied preferably while the container is still at this elevated temperature from the forming operation. The container is carried by the support mechanism through a spray tunnel which is open at its top so that the moil and support mechanism pass above, rather than through the tunnel. During passage of the container through the tunnel, it is conveyed in a vapor atmosphere having suspended particles of a metallic vapor compound the treating atmosphere being controlled and slightly above atmospheric pressure. Exhaust ducts opening in the bottom of the tunnel continuously exhaust the tunnel interior to prevent vapors from escaping from the interior of the tunnel.

PATENTED OCT 26 1971

3,615,327

INVENTOR.
STEVE M. MCLARY.
BY J. R. Nelson and
E. J. Holler
ATT'Y.

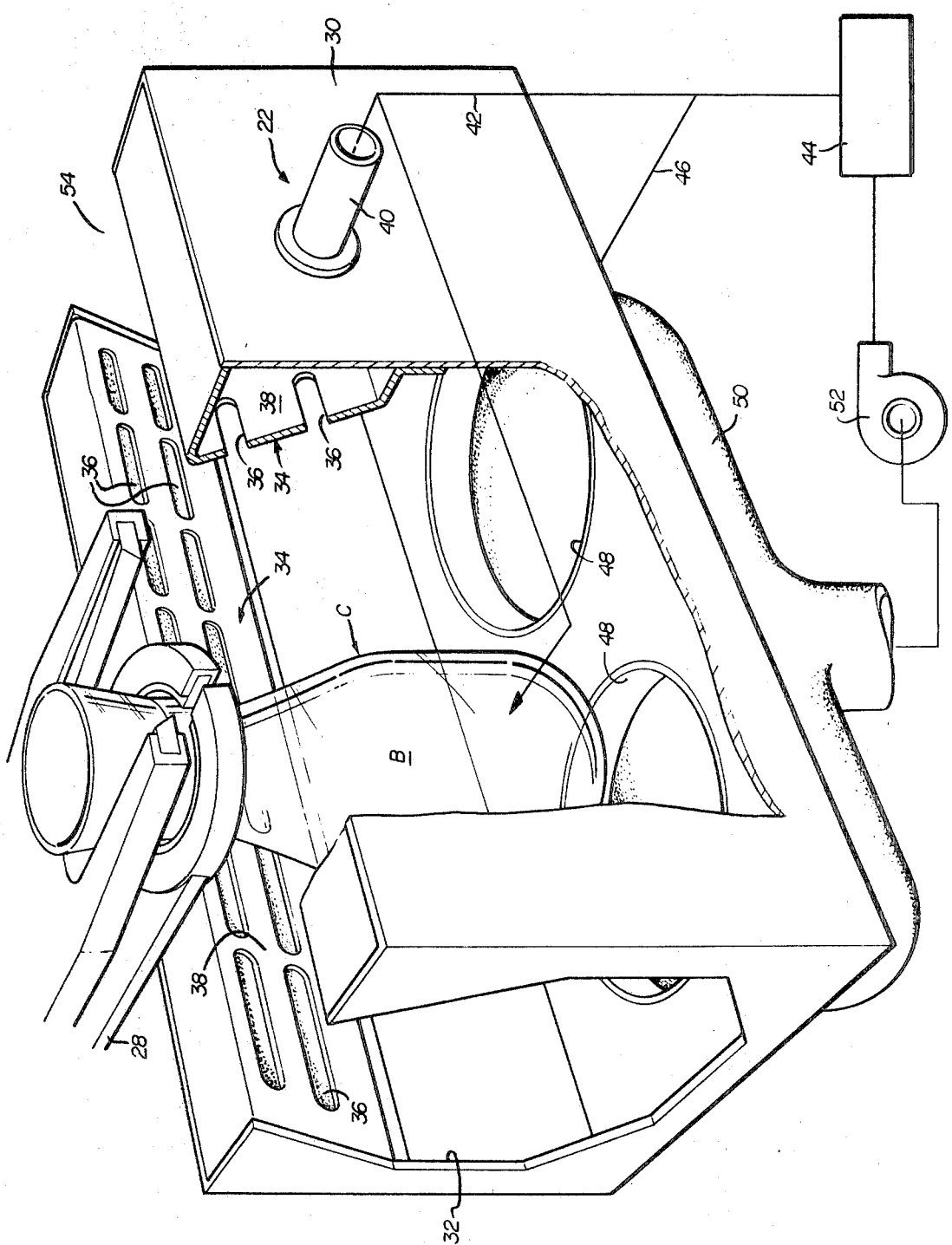

METHODS AND APPARATUS FOR APPLYING OXIDE COATING TO GLASS CONTAINERS

BACKGROUND OF THE INVENTION

The present invention is especially directed to the application of coatings of the general type disclosed and described in detail in U.S. Pat. No. 3,368,915, the purpose of the coatings being to make the exterior surface of the container resistant to scratching or abrasion. Generally speaking, it has been found that the abrasion resistant qualities of a glass surface can be substantially improved by treating the surface with a volatile metallo-organic compound while the temperature of the glass surface is above the pyrolyzing temperature of the compound. The pyrolyzing temperature is defined as the minimum temperature at which the compound is chemically decomposed by the action of heat to form, in the case of the metallo-organic compounds here involved, a thin metallic oxide film on the glass surface. For the general class of compounds known to be operative for this purpose, pyrolyzing temperatures are in general in excess of 600° F., depending upon the specific compound, and in most cases the process is practiced at glass temperatures in the order of 1,000° F. Application of the coating can thus conveniently be made either while the container is still residually heated from the forming process, or in conjunction with annealing.

The metallic vapors employed to coat the containers are generally quite corrosive.

SUMMARY

In accordance with the present invention, a bulb shaped glass container is initially formed with an integral moil portion projecting upwardly from the container finish. The freshly formed container is removed from the forming machine by a transfer conveyor having a set of support fingers which engage the moil of the freshly formed container and transport the container with the container body and finish suspended below the support fingers of the transfer conveyor. The transfer conveyor carries the container along a path in which the container passes through the interior of a tunnel which is open along its top so that the support fingers from which the container is suspended pass above the exterior of the tunnel. During its passage through the tunnel, the container body is exposed to a vapor atmosphere containing a metallic coating compound, the container at this time being still residually heated from the forming operation to a temperature sufficient to achieve pyrolization of the applied compound on the container surface. At the bottom of the tunnel, exhaust ducts continuously exhaust the interior of the tunnel at a rate sufficient to prevent the vapor from escaping from the tunnel through the opening in the top and the openings at opposite longitudinal ends of the tunnel through which the container body passes. The vapor compound is introduced in the tunnel from a region extending along the top on opposite sides of the path of the container so that a flow pattern of vapor downwardly along the sides of the containers is achieved to provide maximum exposure of the container surface to the vapors.

Other objects and features of the invention will become apparent by reference to the following specification and to the drawings.

In the drawings:

FIG. 3 is a perspective view, partially schematic, and with certain parts broken away showing a treating tunnel employed in the practice of the invention.

Figure 1:
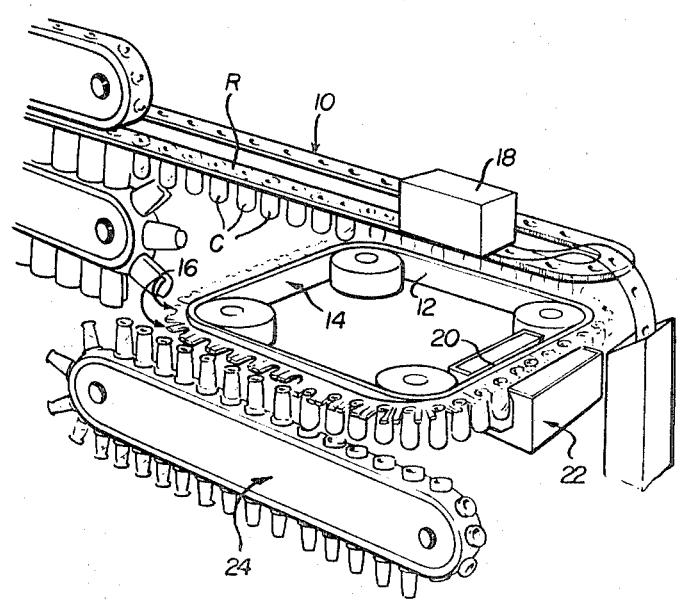
FIG. 1 is a simplified perspective view showing one form of installation embodying the present invention.

In FIG. 1 there is shown, in simplified form, the outlet or discharge end portion of a glass container forming machine of the ribbon type, designated generally 10. Bulb shaped glass containers C are formed in a known manner by ribbon machine 10 and are conveyed, by operation of the ribbon machine, to the right as viewed in FIG. 1 with the individual containers still integrally attached at uniformly spaced intervals to a glass ribbon R supported and conveyed by the ribbon machine. As the containers move to the right as viewed in FIG. 1, they are conveyed into side-by-side relationship with one run 12 of a transfer machine designated generally 14 which takes the form of an endless conveyor having a plurality of uniformly spaced support finger assemblies designated generally 16 which are conveyed along a generally rectangular endless path in synchronism with the movement of the containers C along the ribbon machine. Transfer machine 14 forms the subject matter of a copending application of John D. Banyas, Ser. No. 825,850, filed May 19, 1969, and assigned to the Assignee of the present invention. For the purposes of the present invention transfer machine 14 functions to move the support finger assemblies 16 into operative relationship with the containers C as the support finger assemblies 16 pass along run 12 of the transfer machine. After a support assembly 16 has been moved into operative relationship with a container C, a crack-off device 18 cracks the container off from the ribbon to transfer support of the container from ribbon machine 10 to a support finger assembly 16 of transfer machine 14. After the container C has been received by the support finger assembly 16, the support finger assembly and the supported conveyor pass from run 12 of the transfer machine to the next adjacent run 20 and, as the supported containers pass along run 20, the suspended container is passed through a treating tunnel 22, at which time a metallic vapor is applied to the exterior surface of the container in a manner to be described in more detail below. After passing through the treating tunnel, the containers are automatically deposited, by operation of the transfer machine, onto a subsequent conveyor designated generally 24.

Figure 2:
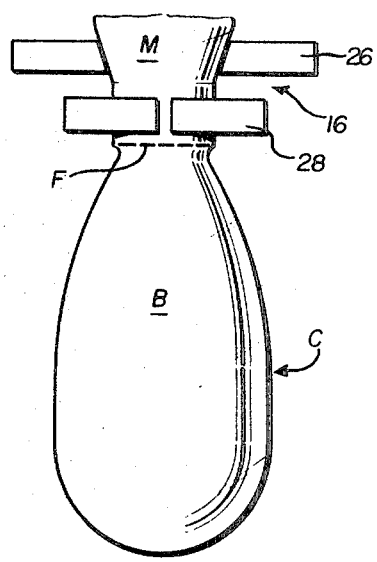
FIG. 2 is a detailed side elevational view showing a freshly formed glass container supported by support fingers of a transfer conveyor of the type shown in FIG. 1.

Referring now to FIG. 2, after the container C has been detached from the ribbon machine 10, the support finger assembly 16 supports the detached container by a fork like upper support finger 26. The container is retained against sliding or rocking movement on the upper support fingers 26 by a pair of lower support fingers 28. The container C is formed with a bulb shaped body B and, when completed, will have its mouth or finish at the dotted line F of FIG. 2. However, at this stage of the process, an integral moil portion M is integrally attached to the container body B and projects upwardly from the finish region. At a later stage in the process, the moil portion will be burned off and discarded. Hence, at this stage of the process, the moil portion M permits handling and support or suspension of the container C in a manner such that the handling mechanism does not have to contact any portion of the article which will be part of the completed container, thus avoiding marring, scratching, or deforming of the freshly formed (pristine glass surfaces) of the container which, when received from the ribbon machine, remains at a temperature in the range of 1,000° F. to 1,200° F. by virtue of residual heat from the forming operation.

The structure of treating tunnel 22 is best seen in FIG. 3. The tunnel is constructed from an elongated sheet metal casing 30 which is formed with openings 32 at each end so shaped as to accommodate free exit and entrance of containers through the tunnel. Extending along the top of the tunnel, at each side of the tunnel, a sheet metal channel element 34 is mounted on the inner side of the tunnel wall to define elongate chambers which extend the entire length of the tunnel. The channel members 34 are formed with a series of openings 36 which extend along a wall 38 of the channel member which is inclined downwardly and inwardly of the tunnel to conform in general to the shape of the shoulder section of the container and to also provide a slight downward flow component to the container coating compound which is discharged as a vapor through openings 36 into the interior of the tunnel.

This vapor is supplied to the chamber defined between member 34 and the tunnel wall through a number of suitably located inlet fittings such as 40 which are connected as by the schematically illustrated conduits 42 to a schematically illustrated vapor source 44. The number of inlet fittings 40 will vary in accordance with the length of the tunnel with the objective of obtaining a maximum vapor concentration along the central portion of the tunnel. Vapor is supplied to the chambers at both sides of the tunnel from source 44, the connections at the side of the tunnel remote from the observer in FIG. 3 being the same as those illustrated and being connected to source 44 via a branch conduit 46.

One or more relatively large exhaust ports or openings 48 are formed in the bottom of the tunnel, these ports being connected via a manifold 50 to an exhaust pump 52, whose discharge side may be connected to return exhausted vapor to vapor source 44. During operation, exhaust pump 52 is operated continuously to exhaust vapor from the interior of the tunnel at a rate sufficient to prevent the escape of vapor from the interior of the tunnel either through the end openings such as 32 or through the elongate opening 54 which extends the entire length of the tunnel to provide clearance for the container C so that the support fingers and moil portion M of the container can pass above the tunnel and thus not be exposed to the vapors in the interior of the tunnel.

As is believed apparent from FIG. 1, the tunnel 30 is mounted along the run 20 of the transfer conveyor 14 so that during the conveying movement of the containers along run 20, the containers pass freely through the interior of the tunnel with the support fingers passing above the tunnel at its exterior.

Although in the illustrated embodiment, the treatment tunnel 22 is disclosed as being located to coat the bottles during their progress through the transfer machine 14, it is believed apparent that the tunnel could be mounted to coat the bottles during their movement along the ribbon machine 10 prior to their transfer to the transfer conveyor 14, if the nature of the treating compound is such as to require a higher glass temperature.

The treatment compounds themselves, their properties and methods of vapor formation are well known, the aforementioned U.S. Pat. No. 3,368,915 being directed to the application of titanium oxide or zinconium oxide films to a glass container surface.

In describing the technique of application of the coating compound onto the exterior surface of the glassware in the practice of the present invention, the terms "spray," "spraying" and "vapor spray" used herein are intended to cover the forms of application of the treating compound as vapor, solution, fluid suspension or emulsion by the introduction thereof into and through the top side openings 36 and exhaust of any excess through the bottom exhaust ports 48. In the preferred method of "spraying" the material, a vapor of the metallo-organic compound is introduced into the tunnel and exhaust is controlled to maintain a pressure in the active parts of the tunnel in the range of 3 to 4 inches of water above atmospheric pressure. Satisfactory glassware coatings are obtained and spraying efficiency is good.

Further details of the structure and operation of the transfer conveyor 14 are disclosed in the aforementioned copending Banyas U.S. Pat. application Ser. No. 825,850, however it is believed apparent that the invention is applicable in general to container conveyors which are capable of suspending and conveying containers from a moil in the manner generally illustrated herein.

I claim:

1. The method of applying a film like coating to a glass container comprising the steps of forming the container with an integral moil portion projecting upwardly from the container finish, supporting the container while at a temperature in excess of 600° F. by engaging a support means with the moil portion at a location spaced above the container finish, carrying the hot container while suspended by the support means through a coating chamber, discharging a vapor spray of coating compound into said chamber toward the container from opposite sides of the path of movement of the upper portion of the container, and continuously exhausting vapor spray from the chamber at a region below the path of movement of the suspended container to confine the vapor spray to a region below the path of movement of the support means.

2. The method of applying a metallic oxide film to the surface of a glass container, comprising the steps of forming the container in a forming machine with a moil portion integral with and projecting upwardly from the container finish, removing the container from the forming machine while it is residually heated to a temperature in the neighborhood of 1,000° F. by engaging a support means with the moil portion at a location spaced above the container finish and transferring the support means away from the forming machine with the container suspended therefrom, passing the suspended residually heated container through a tunnel open at opposite ends and along the top to accommodate free and unobstructed passage of the container therethrough with the support means and moil passing above and at the exterior of the tunnel, continuously spraying a metallic vapor compound into the interior of the tunnel from regions extending along the top of the tunnel at opposite sides of the opening in the top, and continuously exhausting the interior of the tunnel through the bottom of the tunnel to prevent the vapors from escaping through the open ends and top of the tunnel.

3. For use in combination with a conveying means adapted to support and convey a glass container along a given path with the container suspended from the conveying means by a moil portion integral with and projecting upwardly from the container finish; means for applying a filmlike coating to the container during movement along said given path comprising a spray tunnel mounted along said given path, said tunnel having a bottom wall underlying said path and sidewalls extending upwardly from said bottom wall along opposite sides of said path in spaced relationship to the path of movement of the container, means defining a pair of elongate chambers extending along the top of said sidewalls at the interior side thereof, said chambers being spaced from each other to define an opening extending the entire length of the top of the tunnel to accommodate movement of the moil portion of the container through the tunnel with said conveying means passing above the tunnel, means for spraying a coating forming vapor from said chambers into the interior of said tunnel, and means for exhausting the interior of the tunnel through said bottom wall to prevent the escape of said vapor from the interior of said tunnel.

4. Apparatus for applying a filmlike coating to a freshly formed glass container having an integral moil portion projecting upwardly from the container finish comprising conveying means engageable with the moil portion only of a container to suspend and convey the container along a given path of movement, means defining a coating chamber extending along said given path having open opposite ends a continuous opening extending along the top of the chamber, said chamber being located below the path of movement of said conveying means to accommodate movement of the suspended container through said chamber via the open ends thereof with said conveying means passing above said chamber and said moil portion projecting upwardly through said continuous opening in the top of said chamber, means for discharging a vapor spray from the upper portion of said chamber adjacent to and along the opposite sides of said continuous opening, and means for withdrawing vapor spray through outlets located along the bottom of said chamber at a rate sufficient to substantially combine the vapor spray to the interior of said chamber.

PO-1050
(5/69)

UNITED STATES PATENT OFFICE
CERTIFICATE OF CORRECTION

Patent No. 3,615,327      Dated October 26, 1971

Inventor(s) Steve M. McLary

It is certified that error appears in the above-identified patent and that said Letters Patent are hereby corrected as shown below:

Column 2, line 26: change "conveyor" to read --container--

Column 4, line 68 (Claim 4): change "combine" to read

--confine--

Signed and sealed this 18th day of April 1972.

(SEAL)
Attest:

EDWARD M. FLETCHER, JR.
Attesting Officer

ROBERT GOTTSCHALK
Commissioner of Patents